United States Patent
Palmaro et al.

(10) Patent No.: US 12,197,641 B2
(45) Date of Patent: Jan. 14, 2025

(54) SYSTEMS AND METHODS FOR DYNAMIC CONTINUOUS INPUT IN MIXED REALITY ENVIRONMENTS

(71) Applicant: Unity Technologies ApS, Copenhagen (DK)

(72) Inventors: Gregory Lionel Xavier Jean Palmaro, San Francisco, CA (US); Dylan Charles Urquidi-Maynard, San Francisco, CA (US); Eric Provencher, Montreal (CA); Ryan Goodrich, Redmond, WA (US)

(73) Assignee: Unity Technologies ApS, Copenhagen (DK)

( * ) Notice: Subject to any disclaimer, the term of this patent is extended or adjusted under 35 U.S.C. 154(b) by 163 days.

(21) Appl. No.: 18/105,780

(22) Filed: Feb. 3, 2023

(65) Prior Publication Data
US 2023/0244310 A1 Aug. 3, 2023

Related U.S. Application Data

(60) Provisional application No. 63/306,483, filed on Feb. 3, 2022.

(51) Int. Cl.
*G06F 3/01* (2006.01)

(52) U.S. Cl.
CPC .............. *G06F 3/013* (2013.01); *G06F 3/015* (2013.01); *G06F 3/017* (2013.01)

(58) Field of Classification Search
CPC ........... G06F 3/013; G06F 3/015; G06F 3/017
See application file for complete search history.

(56) References Cited

U.S. PATENT DOCUMENTS

| | | | | |
|---|---|---|---|---|
| 11,640,760 B2* | 5/2023 | Arling | ................... | G08C 19/28 |
| | | | | 340/12.54 |
| 11,687,217 B2* | 6/2023 | Hatambeiki | ........... | G11B 27/34 |
| | | | | 715/737 |
| 11,687,993 B2* | 6/2023 | Ogaz | ...................... | G06Q 30/02 |
| | | | | 705/26.7 |
| 2006/0245097 A1* | 11/2006 | Chang | .............. | H04N 21/42204 |
| | | | | 360/1 |
| 2012/0321112 A1* | 12/2012 | Schubert | ................ | H04R 25/43 |
| | | | | 381/312 |
| 2013/0113698 A1* | 5/2013 | Kuroume | ................ | A63F 13/52 |
| | | | | 345/156 |
| 2017/0366778 A1* | 12/2017 | Kim | ................. | H04N 21/43615 |
| 2019/0180770 A1* | 6/2019 | Kothari | ................... | G06F 3/167 |

\* cited by examiner

*Primary Examiner* — Doon Y Chow
*Assistant Examiner* — Dennis Chow
(74) *Attorney, Agent, or Firm* — Schwegman Lundberg & Woessner, P.A.

(57) ABSTRACT

A method of smoothly transitioning between input devices with respect to a virtual reality environment is disclosed. A probable user input action is determined based on input data from a plurality of input devices. A best device is selected from the plurality of input devices based on a quality of a signal of the best device relative to qualities of signals of other devices of the plurality of input devices. Based on a determination that the selected best device is not the same as a previously selected best device from the plurality of devices, a transition between the previously selected device and the best selected device is determined and the transition is used to drive the probable user input action based on input data from the selected best device and input data from the previously selected best device.

20 Claims, 6 Drawing Sheets

SYSTEMS AND METHODS FOR DYNAMIC CONTINUOUS INPUT IN MIXED REALITY ENVIRONMENTS

CROSS-REFERENCE TO RELATED APPLICATIONS

This application claims the benefit of U.S. Provisional Application No. 63/306,483, filed Feb. 3, 2022, which is incorporated by reference herein in its entirety.

TECHNICAL FIELD

The subject matter disclosed herein generally relates to the technical field of extended reality (XR) or mixed reality (MR) systems.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

The systems and methods described herein include one or more components or operations that are non-routine or unconventional individually or when combined with one or more additional components or operations, because, for example, they provide a number of valuable benefits including providing a smooth handling of input devices for extended reality (XR) operating systems and applications in order to at least support passthrough mode (wherein a real-world view of a device surrounding can be seen within a device; e.g., via an external facing camera and a display device), and "blended XR" experiences that include transitioning between AR, VR, and MR in a single continuous user session. In addition, the systems and methods may solve a number of XR input requirements for at least XR passthrough systems that may become more prominent as these systems become more pervasive in the industry. Present and future XR HMD (head mounted displays) devices and operating systems (OS) that support "blended XR" experiences may benefit from this functionality.

In accordance with an embodiment, the dynamic continuous input system and method described herein provide input device mediation that maintains a continuity of an input state (e.g., continuity of an inferred user input flow) related to a user interaction, while one or more input devices that track and describe the interaction have a change of connectivity state and/or signal quality. The change of connectivity state may include an input device transitioning from a connected state to a disconnected state (e.g., going online, becoming available, becoming connected), and vice versa (e.g., going offline, becoming disconnected). The change in connectivity may be temporary or permanent. The dynamic continuous input system and method may facilitate the continuity of input state while potentially disparate input devices change connectivity state and/or signal quality, by determining a best input device (or alternatively determining a best input) from a set of input devices and transitioning control of user input to the determined best input device over time. This may include transitioning control of user input from a first input device to a second input device based on the second qualifying as a determined best input device. For example, the dynamic continuous input system and method may maintain a continuity (e.g., from a user point of view) of an input state for a user interaction that is instigated with a first input device, and which is further processed by a second input device that becomes available (e.g., that comes online) and takes precedence during mid-action (e.g., based on a higher fidelity signal of the second input device). The continuity of input state may include providing a continuous displayed result and/or continuous input control associated with the input state (e.g., without any discernible interruption from the perspective of a user performing the interaction).

The dynamic continuous input system and method described herein solves the issue of presenting a continuous user experience within an XR environment, while non-continuous user input is received during "handoffs" between different user input devices or between different user inputs within a single input device. This "handoff" state may occur when an input device transitions from online to offline (or vice versa) and/or when input signal quality/fidelity drops below a configurable threshold. During a handoff from a first device to a second device, the dynamic continuous input system may process both input from the first device and the second device (wherein the second device may be chosen from a set of devices providing input), to determine, based on the processing, that input from the second device is superior (e.g., based on a measure of input signal quality or fidelity), and provide a smooth transition between the input signal from the first device to the input signal of the second device. Similarly, a handoff may occur between different input signals on a single device. For example, during a handoff from a first input to a second input on a single device, the dynamic continuous input system may process both the first input and the second input, and determine, based on the processing, that the second input is superior (e.g., based on a measure of input signal quality or fidelity), and provide a smooth transition between the first input signal and the second input signal. For example, when the fidelity of a device's computer-vision based hand-tracking drops below a threshold, while another input device (e.g., an EEG bracelet), is simultaneously sending input-data representing the same user action (e.g., hand tracking) to the dynamic continuous input system, that data from both input devices is evaluated and the system gracefully "blends" between the two input devices seeking to process the higher quality input data of various devices attempting to represent a given user input action. An important benefit of the system is to transparently handle such handoff conditions, while not interrupting the user's intended experience. Such functionality may be beneficial for XR HMD's that may provide "blended XR experiences", which may include transitioning between AR/VR/MR in a single continuous user session.

A method of smoothly transitioning between a plurality of input devices with respect to a virtual reality environment is disclosed. A probable user input action is determined based on input data from the plurality of input devices. A best device is selected from the plurality of input devices based on a quality of a signal of the best device relative to qualities of signals of other devices of the plurality of input devices. Based on a determination that the selected best device is not the same as a previously selected best device from the plurality of input devices, a transition between the previously selected device and the best selected device is determined and the transition is used to drive the probable user input action based on input data from the selected best device and input data from the previously selected best device.

Figure 1:
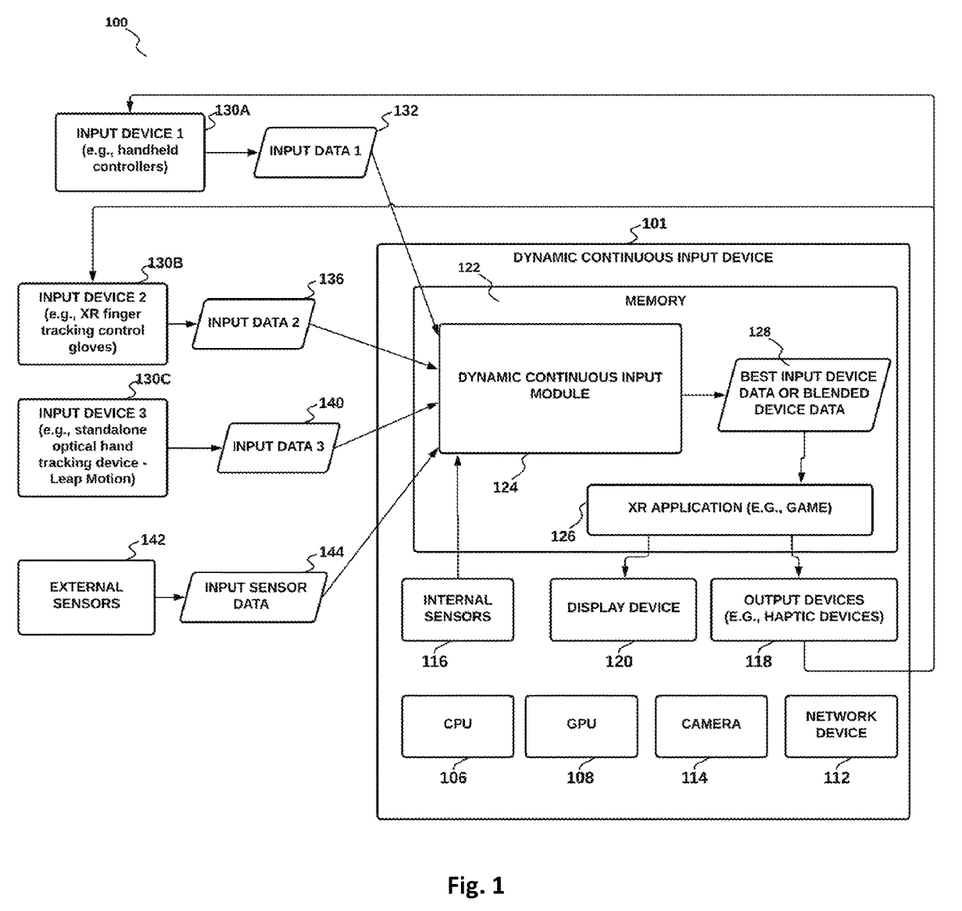
FIG. 1 is a schematic illustrating a dynamic continuous input system, in accordance with one embodiment.

Turning now to the drawings, systems and methods, including non-routine or unconventional components or operations, or combinations of such components or operations, for dynamic continuous input mediation in accordance with embodiments of the disclosure are illustrated. In example embodiments, FIG. 1 is a diagram of an example dynamic continuous input system 100 that includes a dynamic continuous input device 101 and associated devices configured to provide dynamic continuous input system functionality. In the example embodiment, the dynamic continuous input system 100 includes a dynamic continuous input device 101, one or more input devices (e.g., shown in FIG. 1 as input device 1 130A, input device 2 130B, and input device 3 130C and collectively referred to as input devices 130), and one or more external sensors 142. In accordance with an embodiment, the dynamic continuous input device 101, the one or more input devices 130, and the one or more external sensors 142 may be coupled in networked communication via a network (not shown) (e.g., a cellular network, a Wi-Fi network, the Internet, a Bluetooth network, and so forth). The dynamic continuous input device 101 may be a computing device capable of providing a mixed reality or extended reality experience (e.g., to a user). In some embodiments, the dynamic continuous input device 101 is a mobile computing device, such as a head mounted display (HMD), a smartphone or a tablet computer. In other embodiments, the dynamic continuous input device 101 is a computing device such as a desktop computer.

In the example embodiment, the dynamic continuous input device 101 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein in reference to FIG. 2 and FIG. 4.

The dynamic continuous input device 101 may also include one or more networking devices 112 (e.g., wired or wireless network adapters) for communicating across a network. The dynamic continuous input device 101 may further include one or more camera devices 114 which may be configured to capture digital video of the real world near the dynamic continuous input device 101 during operation. The dynamic continuous input device 101 may also include one or more internal sensors 116, such as a global positioning system (GPS) receiver (e.g., for determining a GPS location of the dynamic continuous input device 101), biometric sensors (e.g., for capturing biometric data of a human, or part thereof), motion or position sensors (e.g., for capturing position data of dynamic continuous input device 101 or other objects), and an audio microphone (e.g., for capturing sound data). Some sensors 142 may be external to the dynamic continuous input device 101 and may be configured to wirelessly communicate with the dynamic continuous input device 101 (e.g., such as used in the Microsoft Kinect®, Vive Tracker™, MIT's Lidar sensor, or MIT's wireless emotion detector). In the example embodiment, the camera device 114 and sensors 116 and 142 may capture data from an environment surrounding the dynamic continuous input device 101, such as video, audio, depth information, GPS location, and so forth.

The dynamic continuous input device 101 also includes a memory 122, wherein the memory 122 can be any type of memory device, such as random-access memory, read only or rewritable memory, internal processor caches, and the like. In accordance with an embodiment, though not shown in FIG. 1, the memory 122 may be further divided into a local storage device for storing large amounts of data (e.g., including a hard disk drive, an SSD drive and memory sticks) and a local cache memory for quick retrieval of data (e.g., RAM memory, GPU memory, and CPU cache).

In accordance with an embodiment, the memory 122 may be configured to store a dynamic continuous input module 124. The dynamic continuous input module 124 may be configured to include instructions, that when executed by the processing device 106, cause the processing device 106 to perform a series of tasks or operations, including one or more non-routine tasks or operations or one or more combinations of tasks and operations, as described herein in reference to FIG. 2 and FIG. 4. In accordance with an embodiment, the memory 122 may also be configured to store an XR application 126 which may include a game engine or rendering engine (e.g., not shown in FIG. 1) (e.g., executed by the CPU 106 or GPU 108) that communicates with a display device 120 and also with other hardware such as the input device(s) 130 and output device(s) 118 to present a 3D environment (e.g., a virtual reality environment, a mixed reality environment, extended reality environment, and the like) to a user. The output devices may include haptic devices. The display device 120 may include a touchscreen of a tablet or smartphone, or lenses or visor of a VR or AR HMD, which may be configured to display digital objects in conjunction with a real-world view. The XR application 126 (e.g., via the game engine) would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering uses a recent state of the virtual environment and current settings of the virtual environment to generate a visual representation at an interactive frame rate and, independently thereof, the simulation step updates the state of at least some of the digital objects (e.g., at another rate).

In accordance with some embodiments, the dynamic continuous input device 101 is a mobile computing device, such as a smartphone or a tablet computer. In accordance with another embodiment, the dynamic continuous input device 101 is a head-mounted display (HMD) device worn by a user, such as an augmented reality (AR) or virtual reality (VR) visor (e.g., Google Glass®, HTC Vive®, Microsoft HoloLens®, the PlayStation VR™, Oculus Rift™, and so forth). In the example embodiment, the user (e.g., a human) experiences a VR environment or AR environment while wearing the dynamic continuous input device 101. During operation, in the example embodiment, the dynamic continuous input device 101 is mounted on a head of the user, and over both eyes of the user. The user may be presented with a virtual environment which may be viewed and interacted with via the HMD 101 and input devices (e.g., handhelds as described below). The dynamic continuous input device 101 may include a transparent or semi-transparent visor (or "lens" or "lenses") through which the user views their surroundings (also herein referred to as "the real world"). In other embodiments, the dynamic continuous input device 101 may include an opaque visor which may obscure the user's view of the real world and on which a complete virtual environment is displayed (e.g., including displaying video from the camera device 114 in a see-through mode).

The dynamic continuous input system 100 may also include one or more input devices (e.g., 130A, 130B, 130C, or collectively 130) such as, for example, a keyboard or keypad, a mouse, a pointing device, a touchscreen, a handheld device (e.g., hand motion tracking device), a biosensor device, hand tracking gloves, a microphone, a camera, and the like, for inputting information in the form of a data signal readable by the processing device 106. In accordance with an embodiment, the dynamic continuous input module 124 may be configured to receive data from one or more of the input devices 130. Although FIG. 1 shows a total of 3 input devices, the dynamic continuous input system 100 may include any number of input devices 130, and the dynamic continuous input module 124 may be configured to receive data from any number of input devices 130. As an example, and as shown in FIG. 1, input device 1 130A may be a pair of handheld controllers, input device 2 130B may be a pair of finger tracking gloves, and input device 3 130C may be a standalone optical hand tracking device. In accordance with an embodiment, the dynamic continuous input module 124 may be configured to receive data from one or more external sensors 142 and/or internal sensors 116.

In accordance with some embodiments, the user may hold one or more input devices 130 (e.g., input device 1 130A) including hand tracking devices ("handhelds") (e.g., one in each hand). The handhelds may provide information about an absolute or relative position and orientation of a user's hands and, as such, are capable of capturing hand gesture information. The handhelds may be configured to operate directly with the dynamic continuous input device 101 (e.g., via wired or wireless communication with the dynamic continuous input module 124). In some embodiments, the handhelds may be Oculus Touch™ hand controllers, HTC Vive™ hand trackers, PlayStation VR™ hand controllers, or the like. The handhelds may also include one or more buttons or joysticks built into the handhelds. In other embodiments, the user may wear one or more wearable hand tracking devices (e.g., motion tracking gloves, not shown), such as those made commercially available by Manus VR™ (Netherlands). In still other embodiments, hand motion of the user 102 may be tracked without, or in addition to, the handhelds or wearable hand tracking devices via a hand position sensor (not shown, e.g., using optical methods to track the position and orientation of the user's hands) such as, for example, those made commercially available by Leap Motion™, Inc. (a California corporation). Such hand tracking devices (e.g., handhelds) track the position of one or more of the hands of the user during operation.

In some embodiments, the dynamic continuous input device 101 and the various associated hardware and software components described herein may provide AR content instead of, or in addition to, VR content (e.g., in a mixed reality (MR) or extended reality (XR) environment). It should be understood that the systems and methods described herein (e.g., specifically with respect to FIG. 2 and FIG. 4) may be performed with AR content and, as such, the scope of this disclosure covers both AR and VR applications.

In accordance with an embodiment, an input device as described herein includes any module or device which generates a signal (e.g., including data), wherein the signal describes an input action (e.g., interaction) from a user. An input device as described herein may include two or more physical devices; for example, a pair of hand tracking gloves may be considered a single input device, or a pair of handheld devices may be considered as a single input device. In addition, a single physical device may include one or more input devices (e.g., an HMD may include one or more input devices therein). For example, a single HMD device may include a plurality of input sources such as an infra-red hand tracking device and a visible light hand tracking device. An input device may be a sensor device. Input devices may include HMDs, handheld devices, hand tracking devices, full body tracking devices, cameras, touch screens, a mouse, a microphone and more.

Figure 2:
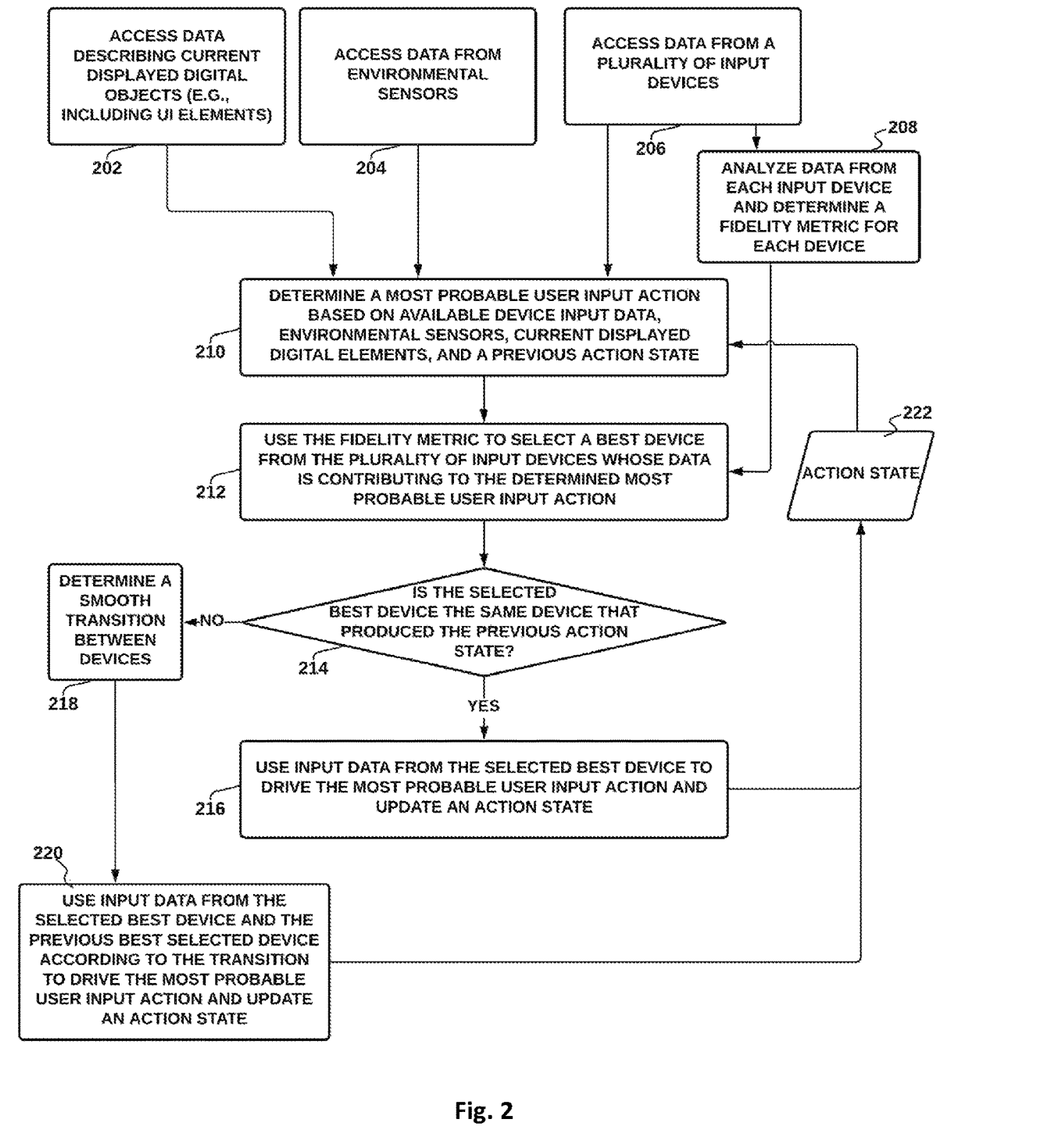
FIG. 2 is a schematic illustrating a dynamic continuous input mediation method, in accordance with one embodiment.

In accordance with an embodiment, and shown in FIG. 2 is a flowchart of a method 200 for dynamic continuous input mediation. The method 200 may be used in conjunction with the dynamic continuous input system 100 as described with respect to FIG. 1. As a step in the method 200, the dynamic continuous input module 124 may access data for the method. In particular, in operation 202 of the method 200, the dynamic continuous input module 124 may access data describing current displayed digital objects on the display device 120. For example, this may include displayed user interface elements and displayed digital objects on the display device 120 (e.g., as displayed by the application 126). In accordance with an embodiment, the data accessed in operation 202 may be used in operation 210 to help determine a most probable user input action.

In accordance with an embodiment, in operation 204 of the method 200, the dynamic continuous input module 124 may access additional sensor data from environmental sensors. In accordance with an embodiment, the additional sensor data may describe an input device 130 (e.g., position, orientation, and/or motion of the input device 130), and may be used to augment the dynamic continuous input mediation method 200, for example, the additional sensor data may be used (e.g., within operations 210 and 212) to help determine that an input state associated with a user interaction should continue to be informed by a second input device coming online, while a first device that instigated the input state goes offline or has a reduced input data quality or fidelity. The additional sensor data may be generated by the external sensors 142 and/or the internal sensors 116, and may include data that describes a position, orientation and/or motion of an input device 130. For example, the additional sensor data may include data for a velocity and/or trajectory of an input device 130 (e.g., an infra-red camera which captures a movement of a handheld input device 130A). As another example, the additional sensor data may also include data describing a field-of-view (FOV) gaze from an HMD (e.g., using an eye tracking device) which may be used to determine whether an input device 130 is within the FOV.

In accordance with an embodiment, in operation 206 of the method 200, the dynamic continuous input module 124 may access data from a set of input devices 130. For example, the dynamic continuous input module 124 may access data from input device 1 130A, input device 2 130B, and input device 3 130C. In accordance with an embodiment, at operation 208 of the method 200, the dynamic continuous input module 124 may analyze the data from the set of input devices (e.g., accessed in operation 206). The analysis of the input device data may include a determination, based on the data, of a fidelity metric for each input device. For example, the fidelity metric may be based on a signal quality received from an input device 130, wherein the signal quality may be determined by a signal strength received from an input device 130, a signal to noise ratio of a received signal, a continuity of a received signal (e.g., a measure of a signal cutting in and out), and more. In accordance with an embodiment, a good signal quality may be associated with a high-fidelity metric.

In accordance with an embodiment, the accessing of data in operation 202, operation 204 and operation 206 may occur over time with regular or irregular cadence.

In accordance with an embodiment, at operation 210 of the method, the dynamic continuous input module 124 determines a most probable user input action based on one or more of the following: available input device data (e.g., from operation 206), environmental sensor data (e.g., from operation 204), current displayed digital elements (e.g., from operation 202), and data 222 describing a previous action state if available. In accordance with an embodiment, a determination of the most probable user input action includes applying a mathematical weight to data that supports a continuation of a previous action state (e.g., described in 222), wherein an action performed by a user represents a continuation of a previous user action (e.g., continuing to drag a digital object in an environment, or continuing to select a UI element in an environment). In accordance with an embodiment, operation 210 includes an analysis of data (e.g., from operation 202, 204 and 206, as well as previous action state data 222) to estimate an intent of a user action. The determination of the most probable user input action may be based on a set of rules, an algorithm, a trained artificial intelligence module, and more. In accordance with an embodiment, the determination of the most probable user input action may use the adaptive XR filter device or system as described below with respect to FIG. 3 and FIG. 4. An artificial intelligence model may be trained with historical data pertaining to previous user inputs of the user and/or other users and then the trained model may be applied to return a prediction based on novel data. The training and/or novel input data may include input data from multiple connected input devices, external monitoring devices, and/or other devices simultaneously as described herein.

In accordance with an embodiment, at operation 212 of the method 200, the dynamic continuous input module 124 uses the fidelity metric (e.g., from operation 208) to select a best device from the set of input devices 130 to represent the most probably user input action (e.g., as determined in operation 210). In accordance with an embodiment, the best device may be a device whose data is contributing to the determined most probable user input action (e.g., determined in operation 210) and which has a higher fidelity metric when compared to other input devices of the set of input devices 130. For example, the dynamic continuous input module 124 may determine in operation 212 that a single input device (e.g., 130A, 130B, or 130C) within the set of input devices 130 has a strong signal and is contributing to the determined most probable user input action.

In accordance with an embodiment, at operation 216, based on the selected best device being a same device that produced the previous action state (e.g., a previous best selected device), the dynamic continuous input module 124 uses input data from the selected best input device to drive the most probable user input action state (e.g., a current action state). For example, this may represent a continuous user action with a single input device. As part of operation 216 action state data 222 is updated.

In accordance with an embodiment, at operation 218, based on the selected best device being a different device than a previous best selected device that produced the previous action state (e.g., a previous input device loses signal strength while another input device has a stronger signal strength), the dynamic continuous input module 124 determines a transition between the selected best device and the previous best selected device. In accordance with an embodiment, the transition may include a gradual transitioning of control from the best selected device and the previous best selected device, which may include a time where input from both devices is used (e.g., averaged, lerped (linear interpolation), or other). In another embodiment, the transitioning may include a determination of an optimal moment of transition of control between the best selected device and the precious best selected device wherein the transition is performed at the optimal moment. In accordance with an embodiment, the previous best selected device may be described within the previous action state data 222. At operation 220, the dynamic continuous input module 124 uses input data from the selected best device and the previous best selected device to drive the most probable user input action state (e.g., a current action state) based on the determined transition. As part of operation 220 action state data 222 is updated.

In accordance with an embodiment, the dynamic continuous input system 100 may provide an abstraction layer between input provided by an input device 130, and an XR interaction system (e.g., within the XR application 126) that includes applied mechanics which can implement actions like grabbing a virtual coffee mug. One benefit of the continuous dynamic input system 100 and method 200 is the hand-off process (e.g., including operation 212, 214, 216, 218, and 220) that is useful with an input device 130 like an XR electroencephalogram (EEG) wristband, which uses EEG sensing to detect hand poses, and can work in tandem with optical hand tracking. The dynamic continuous input system 100 provides a mechanism for continuously applying a grab interaction by using a dynamic handoff between the EEG and optical hand tracking data, to provide the most accurate representation of the user's intent throughout fluctuating tracking quality conditions (e.g., as a user moves around).

In accordance with an embodiment, the systems and methods described herein may work in a local environment wherein all input devices 130 are in a local network, and it may also work in a cloud-based environment to provide networked input device mediation of user interaction across clients with varying forms of presentation and input.

Adaptive XR Input Filter System

Figure 3:
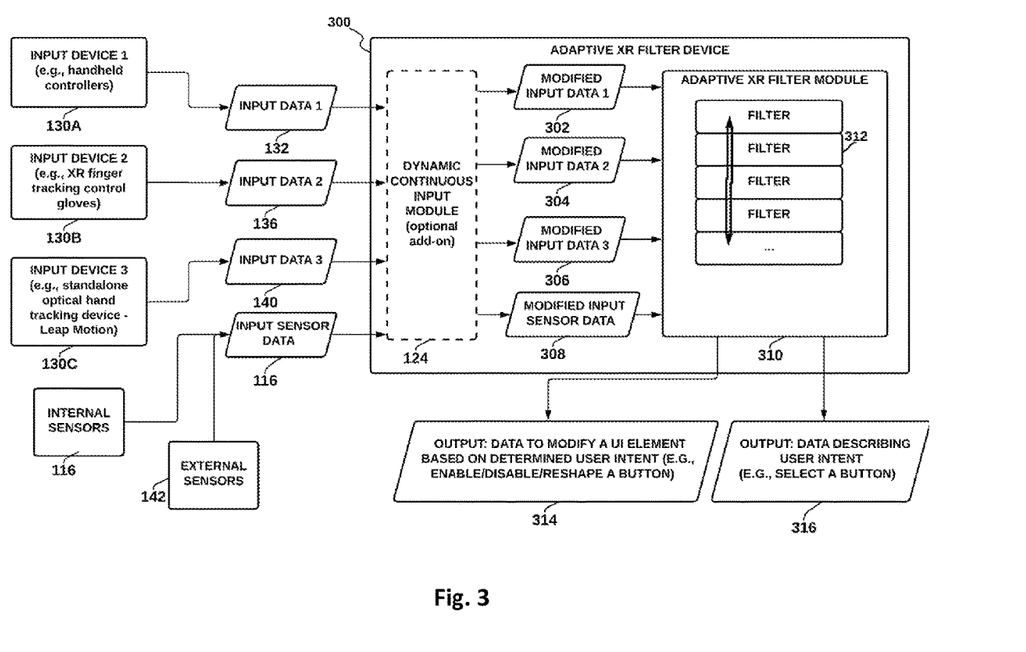
FIG. 3 is a schematic illustrating an adaptive XR input filter system, in accordance with one embodiment.

FIG. 3 depicts an example embodiment of an adaptive XR input filter system, which includes adaptive XR filter device 300. This adaptive XR input filter system performs complex conditional resolution of a user action in an XR environment while also potentially augmenting the underlying data (e.g., collider size, etc.) or visual appearance (e.g., scale, position, motion) of UI elements in order to achieve a successful user action. In XR, in order to provide a greater action resolution fidelity, there may be a number of factors that contribute to the resolution of a user's intent to perform an input action, such as, for example, whether they are looking at a given UI element. In order to resolve an intended user input action (e.g., as part of operation 210 of method 200), the adaptive XR input filter system utilizes a "conditional filter stack" (e.g., wherein the conditional filter stack may include one or more conditional filters 312 within an adaptive XR filter module 310 as shown in FIG. 3) to evaluate potential contributing data being received from input affordances, the HMD (e.g., position, gaze angle, and/or gaze direction), along with supplementary metrics for each input source (e.g., input device), such as velocity, continuous input duration, trajectory, FOV, etc. In XR, simply taking a single input source into account may lead to unintended action resolution, or lack thereof. The adaptive XR input filter system is designed to take any number of filters, including custom "conditional filters" into account when determining the user's intent when performing an input action via an affordance of any sort. In addition, the adaptive XR input filter system facilitates altering various visual and underlying properties of a UI element, or many elements, in order to drive the user toward the successful completion of their intended action.

The adaptive XR input filter system can run atop existing XR input systems, such as the input system provided by Unity Technologies Inc., providing for more appealing "out-of-the-box" user XR experiences, without requiring users to perform significant (e.g., years) of iterative work. In example embodiments, XR developers will encounter the need for this functionality.

In example embodiments, the adaptive XR input filter system mediates the processing of device input on scene UI elements based on criteria defined via supplementary "input filters" 312, each of which may offer its own required criteria. Such an inference-based input mediating and filtering approach (e.g., via the method 400 described in FIG. 4) allows for extracting of real-time data sourced from the HMD and tracked input affordances/devices and the environmental conditions, amongst other factors. The adaptive XR input filter system may then further apply operations, such as the dot-product resulting from the user's gaze in relation to the UI element, in order to prevent false-positive input cases, or provide for the maintenance of an input action when input data fidelity is reduced, while alternatively enabling more freedom of input (e.g., range, speed, etc.) when the user is focused upon a UI element. In example embodiments, the adaptive XR input filter system also allows for the enabling/disabling and reshaping of input target regions (e.g., based on a collection of ordered input filter conditions which may be predetermined, or are dynamically inferred in real-time). Furthermore, in example embodiments, the adaptive XR input filter system is designed to allow for dynamic reordering of input filters based on predefined criteria and which may take into account changes in input affordance quality or state, and/or may be driven by an AI model trained to optimize for the ideal minimum steps needed to complete a given UI/UX action.

In example embodiments, one of the filters focused upon such inference is referred to herein as a "gaze divergence filter". This filter, for example, takes into account the amount to which a user's gaze is focused upon a given UI element, in order to allow or prevent input being processed on that UI element. As an example, the global gaze divergence filter may determine whether an object that is in proximity to the user's hand, and with which the user is trying to interact, is in a line of sight of a head gaze of the user, and based on whether the object is too far out of a cone of vision of the user, the adaptive XR input filter system may not allow interactions to begin. In example embodiments, interactions that are already underway are not stopped from this condition however.

In example embodiments, the adaptive XR input filter system supports the "Dynamic Continuous Input" system 100, which allows or disallows input data to contribute toward inferring a user's intent to perform or continue performing an action in XR. In example embodiments, the XR filter system outputs data 314 to modify a UI element (e.g., see operation 420 of method 400 described in FIG. 4) based on determined user intent (e.g., wherein user intent may include enabling, disabling, and reshaping a button as determined in operation 210) and/or data 316 describing user intent (e.g., selection of a button), and which may include previous user action data 222. The contribution of a given input device's data (e.g., input data 1 132, input data 2 136, input data 3 140, and input sensor data 116) toward resolving the user action may be done via evaluating and weighting some or all potentially contributing data (e.g., modified input data 1 302, modified input data 2 304, modified input data 3 306, and/or modified input sensor data 308), in relation to what the system infers is the intended action the user aims to perform. The weighting may include complete removal of data from one or more input devices 130 (e.g., with a weighting of zero), based on, for example, a weak signal from an input device 130. This input data (e.g., modified or not by the dynamic continuous input module 124) may be filtered via a hierarchical "conditional filter stack" that takes into account all possible contributing input data. This stack of individual input "filters" 312 may be adaptively rearranged (e.g., see operation 410 in method 400 described in FIG. 4) based on a change in the type and number of input providers (e.g., input devices 130), environmental conditions (e.g., via internal sensors 116 and external sensors 142), or other supplementary conditions which may be determined via a custom filter in the stack that induces a filter reorganization condition. In accordance with an embodiment, each filter 312 within a stack of filters may access and use data from one or more input devices 130 and sensors 116 and 142. In example embodiments, the adaptive XR input filter system also supports (e.g., via the method 400 described in FIG. 4) the maintained processing of input, without disrupting or ending the user action, even while input conditions and contributing data may drastically change during the performance of a given user action.

Figure 4:
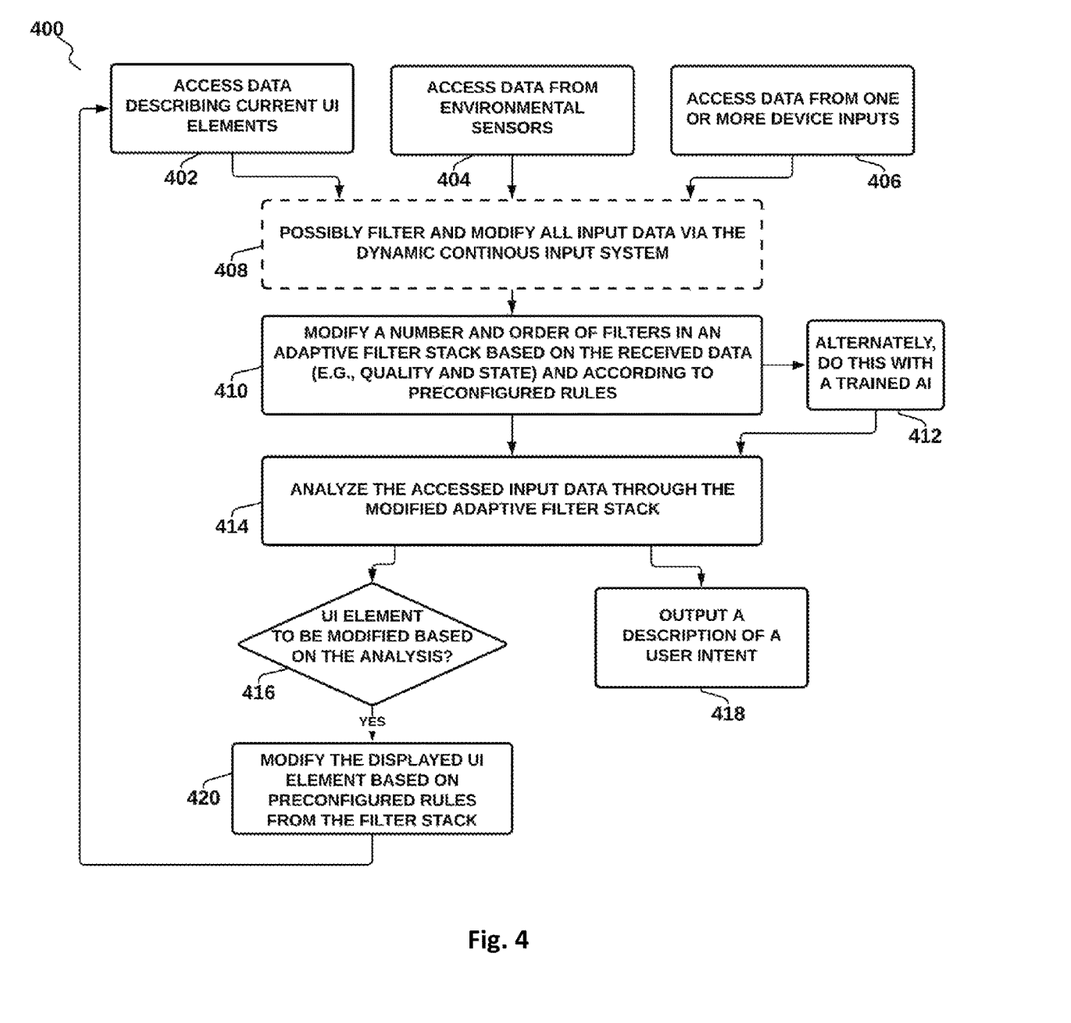
FIG. 4 is a schematic illustrating an adaptive XR input filter method, in accordance with one embodiment.

In example embodiments, the adaptive XR input filter system contributes toward providing a more fluid and uninterrupted user input experience in XR (e.g., via the method 400 described in FIG. 4). The adaptive XR input filter system may facilitate both augmenting the inferred result (e.g., providing an output at operation 418 of the method 400) of input data from multiple input sources and providing for functionality (e.g., see at least operation 414 and 420 in the method 400) that can alter the underlying representation (e.g., collider sizes, position, etc.) or visual presentation (e.g., scale, position, etc.) of UI elements (e.g., in order to drive the user toward the successful completion of a given input action in XR). The XR filter system provides a foundation upon which many factors (e.g., including variability in input device 130 data content and quality, as well as sensor data), be they static or dynamic, can contribute toward a less frustrating user input experience in XR. In contrast, XR input today tends to be implemented in a simplistic and linear form, which doesn't take into account more complex input and environmental conditions, resulting in failed or invalid user actions. Linear means no combined signal processing between devices such as the EEG and optical hand sensor. For example, they only use a single signal and apply that to a "controller" type data structure that applications (e.g., a software application) consume for interaction or there is no bundling of multiple signal sources to apply to a single object (e.g., the same "Hand").

FIG. 4 depicts an example method 400 of modifying a displayed UI element and/or outputting a description of user intent. In example embodiments, the method 400 may be implemented by the adaptive XR input filter system of FIG. 3 and/or the dynamic continuous input system 100.

At operation 402, data describing current UI elements are accessed (e.g., elements displayed on a display device).

At operation 404, data from environmental sensors is accessed. This may include internal sensors 116 and/or external sensors 142, which may provide data describing an environment surrounding an adaptive XR filter device 300, and/or which may provide data describing a position, orientation, and/or motion of an input device 130.

At operation 406, data from one or more input devices 130 is accessed. In accordance with an embodiment, operations 402, 404, and 406 may occur continuously and contemporaneously with each other and with other operations within the method 400.

At operation 408, some or all of the data accessed at operations 402, 404, and/or 406 is optionally filtered and/or modified by a separate system (e.g., the dynamic continuous input system of FIG. 1 and FIG. 2). The filtering and modification may apply one or more operations within the method 200 described in FIG. 2. For example, data from one or more input devices 130 may be weighted (e.g., removed).

At operation 410, a number and/or order of filters 312 in an adaptive filter stack (e.g., within an adaptive XR filter module 310) is modified based on the accessed or modified data (e.g., based on a quality or state of the data) based on one or more preconfigured rules and/or a machine-learned model 412, such as the machine-learned model described with respect to FIG. 3.

At operation 414, the accessed or received data is analyzed through a modified adaptive filter stack, such as the filter stack described with respect to FIG. 3.

At operation 416, a determination is made of whether to modify a UI element based on the analysis of operation 414; Additionally or alternatively, at operation 418, an output describing user intent is generated (e.g., as described above with respect to FIG. 3).

At operation 420, a UI element is modified based on the preconfigured rules from the filter and/or the machine-learned algorithm.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
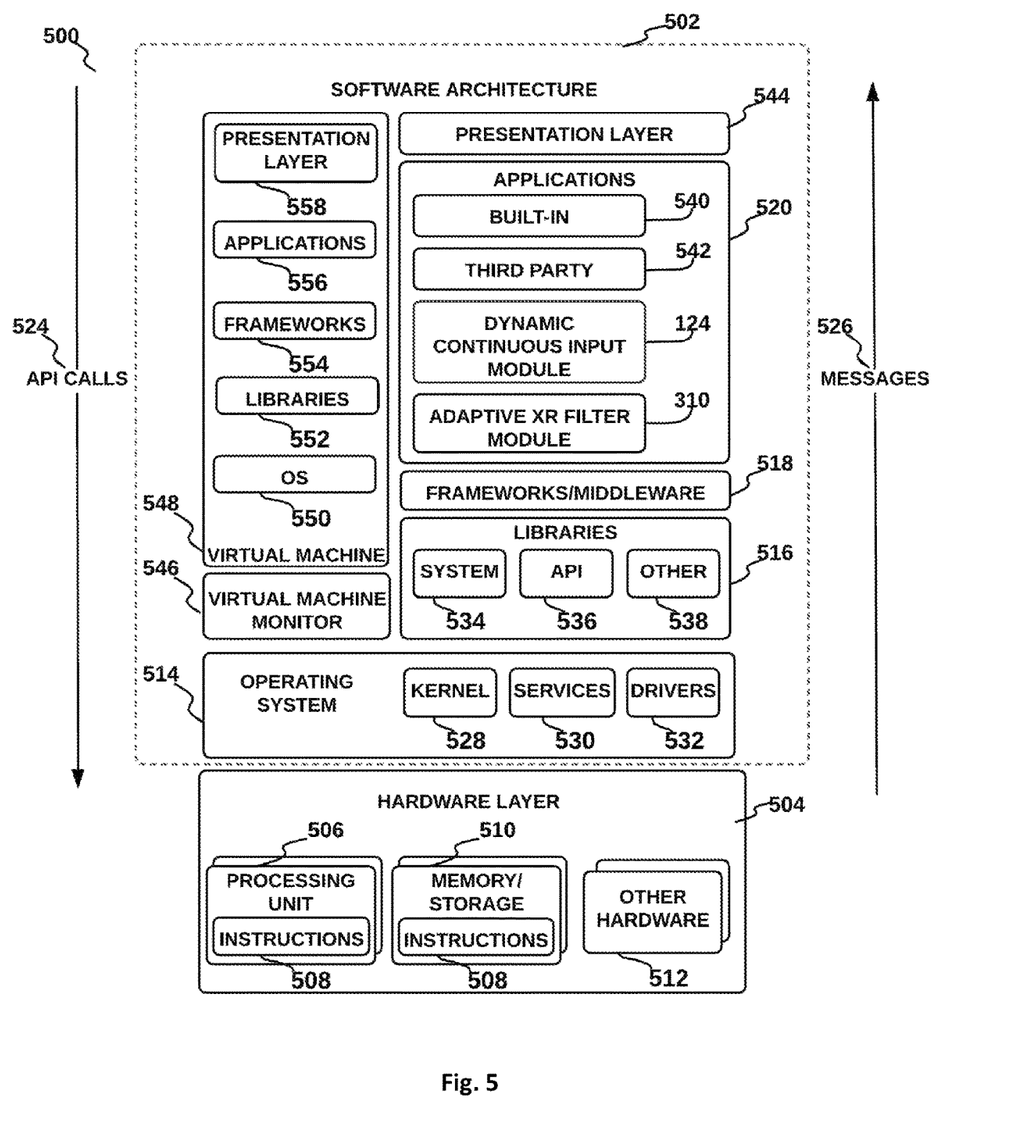
FIG. 5 is a block diagram illustrating an example software architecture, which may be used in conjunction with various hardware architectures described herein.

FIG. 5 is a block diagram 500 illustrating an example software architecture 502, which may be used in conjunction with various hardware architectures herein described to provide a gaming engine 501 and/or components of the dynamic continuous input system 100 and/or the adaptive XR input filter system. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
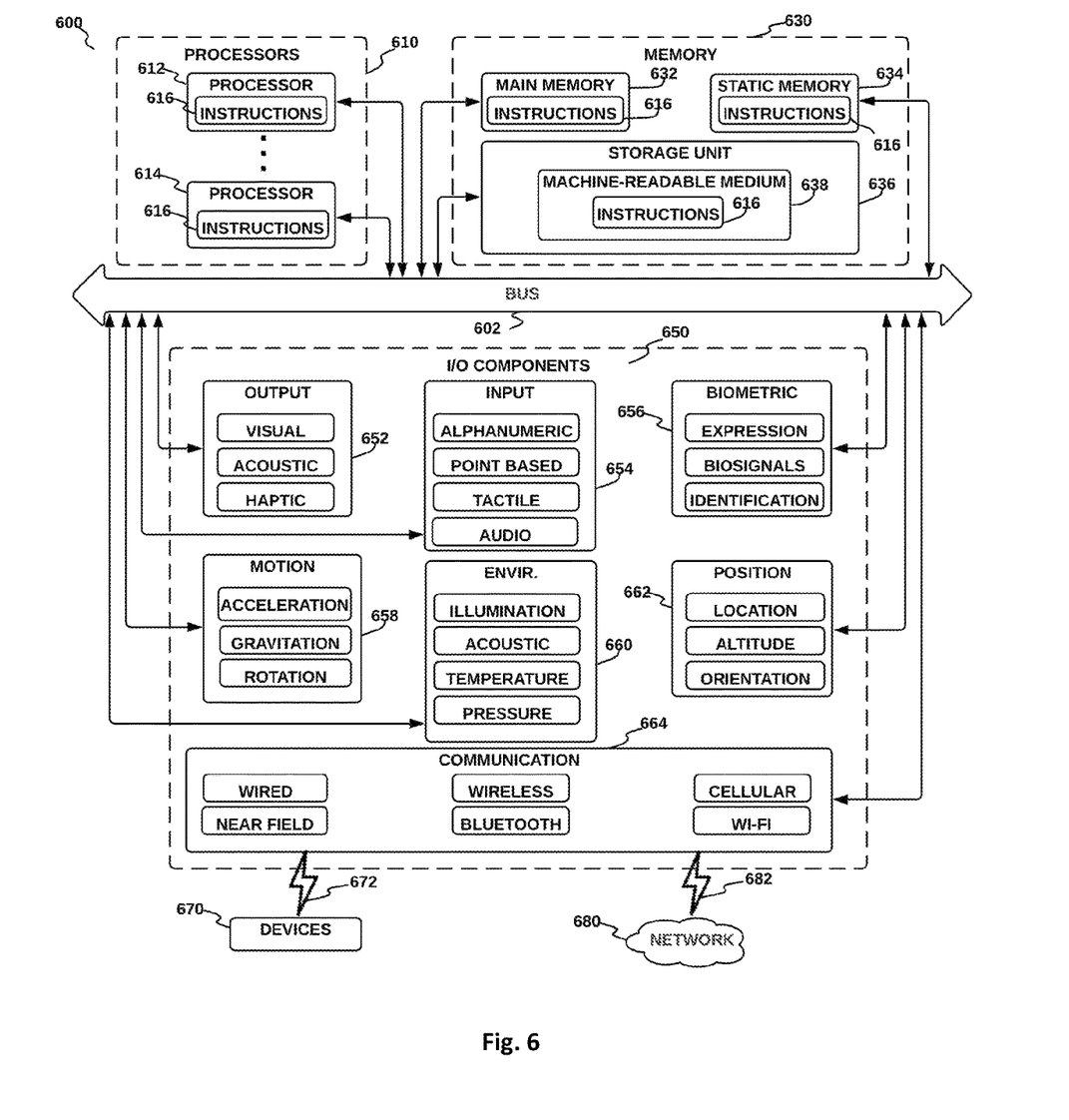
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 600, according to some example embodiments, configured to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment, including 3D digital models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

Throughout the description herein, the term 'extended reality' (XR) should be understood to include all combined environments in the spectrum between reality and virtual reality (VR) including virtual reality, augmented reality (AR), augmented virtuality (AV), and Mixed Reality (MR), wherein MR is a mix of VR and AR.

What is claimed is:

1. A system comprising:
   one or more computer processors;
   one or more computer memories;
   a set of instructions stored in the one or more computer memories, the set of instructions configuring the one or more computer processors to perform operations, the operations comprising:
   determining a probable user input action based on input data from a plurality of input devices;
   selecting a best device to represent the probable user input action, the selecting from the plurality of input devices based on a quality of a signal of the best device relative to qualities of signals of other devices of the plurality of input devices; and
   based on a determination that the selected best device is not the same as a previously selected best device from the plurality of devices, determining a transition between the previously selected device and the best selected device and using the transition to drive the probable user input action based on input data from the selected best device and input data from the previously selected best device.

2. The system of claim 1, the operations further comprising, based on the determination, updating an action state corresponding to the probable user action based on the input data from the selected best device and the input data from the previously selected best device, the action state being provided such that the probable user action is treated as a continuation of a previous user input action.

3. The system of claim 1, wherein the fidelity metrics are based on connection states associated with the plurality of devices.

4. The system of claim 1, wherein the transition includes blending augmented reality, virtual reality, or mixed reality experiences in a single continuous user session.

5. The system of claim 1, wherein the quality of the signal of the best device is measured by one or more of a strength of the signal, a signal-to-noise ratio of the signal, or a continuity of the signal.

6. The system of claim 1, wherein one of the plurality of devices includes a head-mounted display (HMD) and the determining of the probable user input is based on a focus of a gaze of a user of the HMD.

7. The system of claim 1, wherein the plurality of devices includes a computer-vision based device and an electroencephalogram (EEG) device and the probable user input is based on hand tracking.

8. A non-transitory computer-readable storage medium storing a set of instructions that, when executed by one or more computer processors, causes the one or more computer processors to perform operations, the operations comprising:
  determining a probable user input action based on input data from a plurality of input devices;
  selecting a best device from the plurality of input devices based on a quality of a signal of the best device relative to qualities of signals of other devices of the plurality of input devices; and
  based on a determination that the selected best device is not the same as a previously selected best device from the plurality of devices, determining a transition between the previously selected device and the best selected device and using the transition to drive the probable user input action based on input data from the selected best device and input data from the previously selected best device.

9. The non-transitory computer-readable storage medium of claim 8, the operations further comprising, based on the determination, updating an action state corresponding to the probable user action based on the input data from the selected best device and the input data from the previously selected best device.

10. The non-transitory computer-readable storage medium of claim 8, wherein the fidelity metrics are based on connection states associated with the plurality of devices.

11. The non-transitory computer-readable storage medium of claim 8, wherein the transition includes blending augmented reality, virtual reality, or mixed reality experiences in a single continuous user session.

12. The non-transitory computer-readable storage medium of claim 8, wherein the quality of the signal of the best device is measured by one or more of a strength of the signal, a signal-to-noise ratio of the signal, or a continuity of the signal.

13. The non-transitory computer-readable storage medium of claim 8, wherein one of the plurality of devices includes a head-mounted display (HMD) and the determining of the probable user input is based on a focus of a gaze of a user of the HMD.

14. The non-transitory computer-readable storage medium of claim 8, wherein the plurality of devices includes a computer-vision based device and an electroencephalogram (EEG) device and the probable user input is based on hand tracking.

15. A method comprising:
  determining a probable user input action based on input data from a plurality of input devices;
  selecting a best device from the plurality of input devices based on a quality of a signal of the best device relative to qualities of signals of other devices of the plurality of input devices; and
  based on a determination that the selected best device is not the same as a previously selected best device from the plurality of devices, determining a transition between the previously selected device and the best selected device and using the transition to drive the probable user input action based on input data from the selected best device and input data from the previously selected best device.

16. The method of claim 15, further comprising, based on the determination, updating an action state corresponding to the probable user action based on the input data from the selected best device and the input data from the previously selected best device.

17. The method of claim 15, wherein the fidelity metrics are based on connection states associated with the plurality of devices.

18. The method of claim 15, wherein the transition includes blending augmented reality, virtual reality, or mixed reality experiences in a single continuous user session.

19. The method of claim 15, wherein the quality of the signal of the best device is measured by one or more of a strength of the signal, a signal-to-noise ratio of the signal, or a continuity of the signal.

20. The method of claim 15, wherein one of the plurality of devices includes a head-mounted display (HMD) and the determining of the probable user input is based on a focus of a gaze of a user of the HMD.

* * * * *